Figure 1:
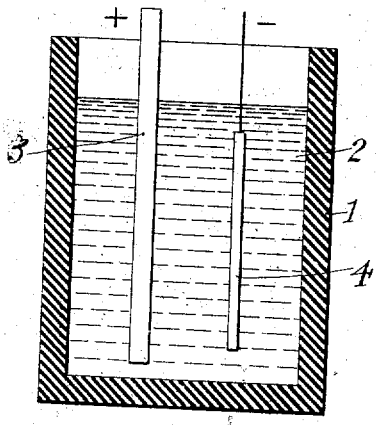

No. 12,117.

REISSUED JUNE 9, 1903.

A. G. BETTS.

ELECTRODEPOSITED LEAD.

APPLICATION FILED APR. 22, 1903.

Witnesses:
Raphael Netter
S.S. Dunham

Anson G. Betts, Inventor by Kerr, Page & Cooper Att'ys

No. 12,117. Reissued June 9, 1903.

UNITED STATES PATENT OFFICE.

ANSON GARDNER BETTS, OF LANSINGBURG, NEW YORK.

ELECTRODEPOSITED LEAD.

SPECIFICATION forming part of Reissued Letters Patent No. 12,117, dated June 9, 1903.

Original No. 713,278; dated November 11, 1902. Application for reissue filed April 22, 1903. Serial No. 153,878.

*To all whom it may concern:*

Be it known that I, ANSON GARDNER BETTS, a citizen of the United States, and a resident of Lansingburg, county of Rensselaer, and State of New York, have invented certain new and useful Improvements in Electrodeposited Lead, of which the following is a specification, accompanied by drawings.

The present invention relates to a lead product obtained by electrolysis.

The lead resulting from electrolysis by methods heretofore commonly employed is characterized by lack of density, incoherency, and by a crystalline spongy formation, rendering the electrodeposit unsuitable for fusion.

The object of my invention is to produce by electrolytic treatment substantially pure lead having substantially the density and homogeneity of cast-lead. Such object is attained by the employment in connection with a suitable electrolyte of an agent capable of restraining the crystallization of the deposit.

To carry out my invention, I employ a suitable electrolyte—such as, for example, a solution of a lead salt of fluorin acid, as described in United States Letters Patent No. 679,824, granted to me August 6, 1901. To the electrolyte is added a quantity of reducing agent, which I have found gives a deposit characterized as herein described. Among the substances which I have found available for such purposes are: gelatin, pyrogallol, resorcinol, saligenin, orthoamidophenol, hydroquinone, and sulfurous acid. Phenols of the aromatic series are well adapted for use in the present process by reason of their being easily oxidizable. The characteristics of the electrodeposit are believed to be due to the reducing action of the agent employed.

The agent contained in the electrolyte, as above stated, serves to restrain the crystallization of the electrodeposited lead and causes the same to form at or upon the cathode in a solid coherent body of substantially uniform structure throughout having substantially the density and homogeneity of cast-lead, constituting a product which by reason of its physical properties facilitates the practical electrolytic refining operations and which may be fused without the formation of an undue amount of dross. By the present process I am able to produce without mechanical treatment a deposit that can be made of considerable thickness and which is non-porous, as shown by the specific gravity of a mass of it. A product is easily made with a specific gravity of 11.36, the same metal remelted and cast having the same density. I have observed with some of the more active of these agents, as gelatin and pyrogallol, the projections that always occur on thick electrodeposits are nodular, while with some of the weaker agents, as orthoamidophenol and saligenin the projections are apt to be crystals. When the projections are nodular, they swell into lumps on the surface during electrolysis, reducing the liability of short-circuiting during practical working of the process. With the crystalline form of projection short-circuiting occurs, rendering such deposits less desirable or suitable for electrolytic refining or electroplating, although the deposit is superior to that obtained by prior electrolytic processes. There appears to be a very slight increase in the weight of the lead deposit in connection with the use of the above agents. These agents also affect to some extent the solution of lead at the anode by preserving the mass of solid lead underneath the anode slime with a somewhat-smoother surface.

In practicing my present invention I prefer a current strength of ten to twenty amperes per square foot of cathode-surface and a corresponding tension of .15 to .35 volts for each element. With higher currents the lead becomes harder and more brittle and takes on a whitish color and silvery luster. A sample deposited with a current of forty amperes per square foot showed a specific gravity of 11.276. In general the deposited lead is apt to be slightly stiffer than ordinary lead; but this stiffness may be regulated at will by varying the current density and the quantity of agent in the solution.

Of the above-named agents I have found gelatin the cheapest and to give the best results and prefer its use in the proportion of one part of gelatin, by weight, to five thousand parts of solution. The current efficiency does not appear to be affected by the presence of gelatin or of any of the other named agents in the electrolyte. The agent may be applied in the electrolyte in such quantities as desired from time to time. If gelatin is used, it is dissolved in hot water and a sufficient quantity of this solution added to the electrolyte, so as to make the desired proportion.

The product of the method described is superior to lead products of prior processes for remelting and for maintaining without attention the proper conditions of work in the electrolytic refining-tanks—that is, without short-circuiting. As the electrodeposit is not mechanically treated while being formed by the present process, it retains undisturbed the normal structural characteristics due to electrolysis. The appearance of the surface of the deposit changes as the electrolysis proceeds, beginning with a frosty appearance and becoming coarser until it has a pebbly or botryoidal appearance.

Any suitable electrolytic apparatus may be employed to carry out the present process. I have shown one form of apparatus in the accompanying drawings, in which—

Figure 2:
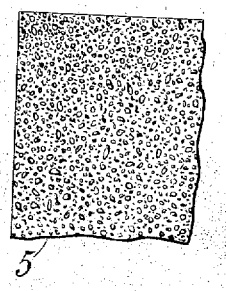
Figure 3:
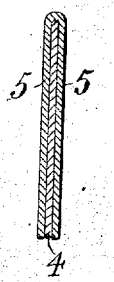

Figure 1 is a vertical cross-section of the apparatus employed in treating lead by my improved process. Fig. 2 is a plan view of a metallic plate electroplated with lead by my improved process, the plate being partly broken away. Fig. 3 is a vertical cross-section of the same.

1 is the electrolytic vat containing the electrolyte 2, with a restraining agent, as above described.

3 is the anode, and 4 the cathode, suspended in the electrolyte and connected with the respective poles of an electric energizer. (Not shown.) The anode consists of lead or lead-alloy to be refined. The cathode is shown of a metallic plate suspended in position to receive the deposited lead.

5 represents the electrodeposited lead having the characteristics above described.

I claim, and desire to obtain by Letters Patent, the following:

1. As a new product, electrodeposited lead characterized by substantial purity, coherency, uniformity of structure throughout, and having substantially the density and homogeneity of cast-lead.

2. As a new product, electrodeposited lead characterized by substantial purity, coherency and uniformity of structure throughout, practically free from crystalline form and having substantially the homogeneity of cast-lead with a density of about 11.3, and retaining the normal structural characteristics due to electrolysis.

In testimony whereof I have signed this specification in the presence of two subscribing witnesses.

ANSON GARDNER BETTS.

Witnesses:
JOHN H. SOUTHWORTH,
F. P. COLE.